United States Patent [19]
Chiesa et al.

[11] Patent Number: 4,460,158
[45] Date of Patent: Jul. 17, 1984

[54] LIFT FOR MOPEDS AND MOTORCYCLES

[76] Inventors: Matteo Chiesa; Marco Chiesa, both of C.so Canale, 21, Alba, Italy

[21] Appl. No.: 250,148

[22] Filed: Apr. 2, 1981

[30] Foreign Application Priority Data

Apr. 23, 1980 [IT] Italy .................. 67635 A/80

[51] Int. Cl.³ .............................................. B60P 1/48
[52] U.S. Cl. .................................................... 254/124
[58] Field of Search ............ 254/8 R, 8 B, 8 C, 10 R,
254/10 B, 10 C, 3 R, 3 B, 3 C, 133, 134, 88;
211/5, 22

[56] References Cited

U.S. PATENT DOCUMENTS

| | | | |
|---|---|---|---|
| 2,748,459 | 6/1956 | Orr | 254/134 |
| 2,808,155 | 10/1957 | Boggess | 254/10 B |
| 2,906,497 | 9/1959 | Wolf | 254/10 B |
| 3,783,659 | 1/1974 | Rossi | 211/5 |
| 4,077,607 | 3/1978 | Lovelady | 254/88 |
| 4,251,056 | 2/1981 | Maniglia | 254/8 B |

FOREIGN PATENT DOCUMENTS

| | | | |
|---|---|---|---|
| 1110500 | 10/1955 | France | 254/3 B |
| 1111799 | 3/1956 | France | 254/8 B |
| 464325 | 6/1951 | Italy | 211/22 |

*Primary Examiner*—Robert C. Watson
*Attorney, Agent, or Firm*—Young & Thompson

[57] ABSTRACT

A lift for raising mopeds and motorcycles, in which a base is provided to which there is hinged a jack, the rod of which is hinged to a frame rotating about a horizontal axis relative to said base; one end of the frame is provided with a motorcycle support adaptable to the footboard of a Vespa, on which it acts in the manner of a clamp, and adaptable to the stand of a normal motorcycle, which is wedged into it; if lifting a Vespa, the support is rotatable about an axis parallel to the axis of rotation of the frame, in order to incline the Vespa at two opposite angles about the vertical raised position.

3 Claims, 10 Drawing Figures

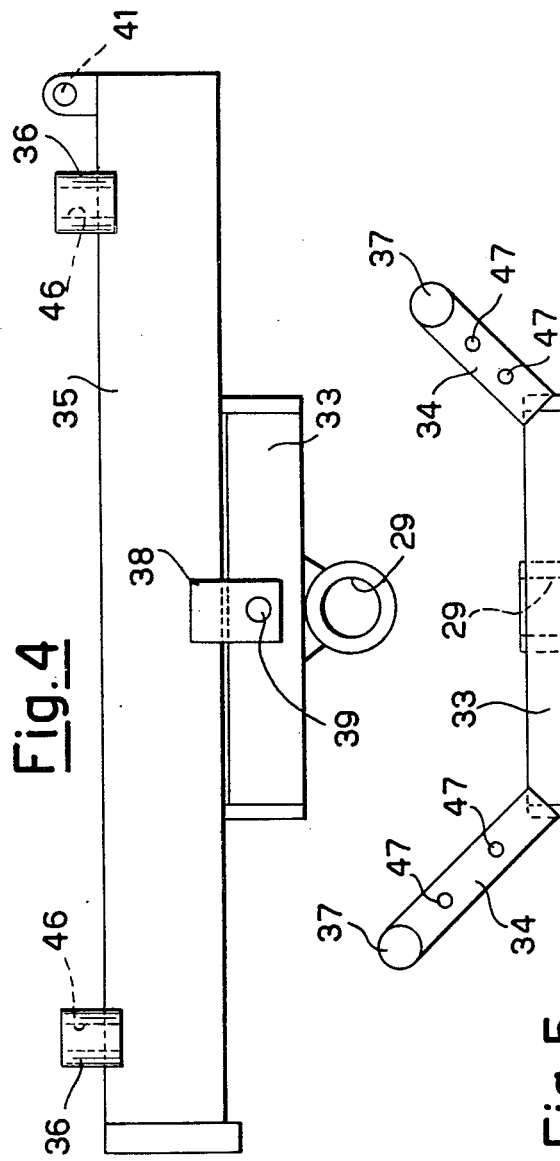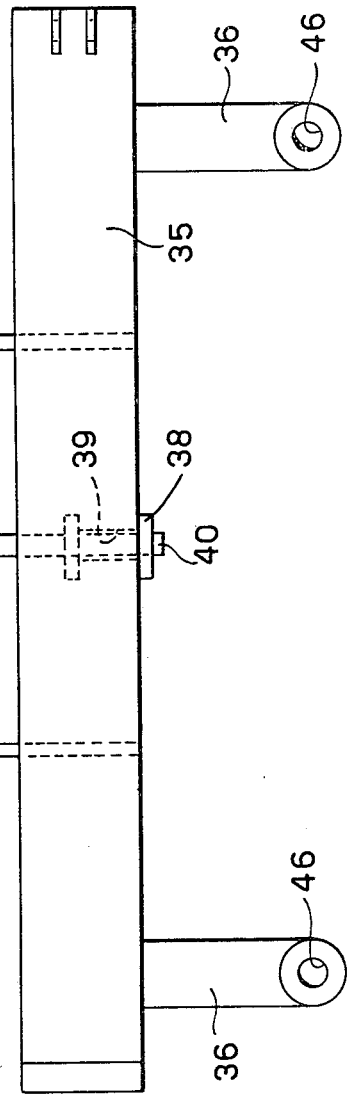

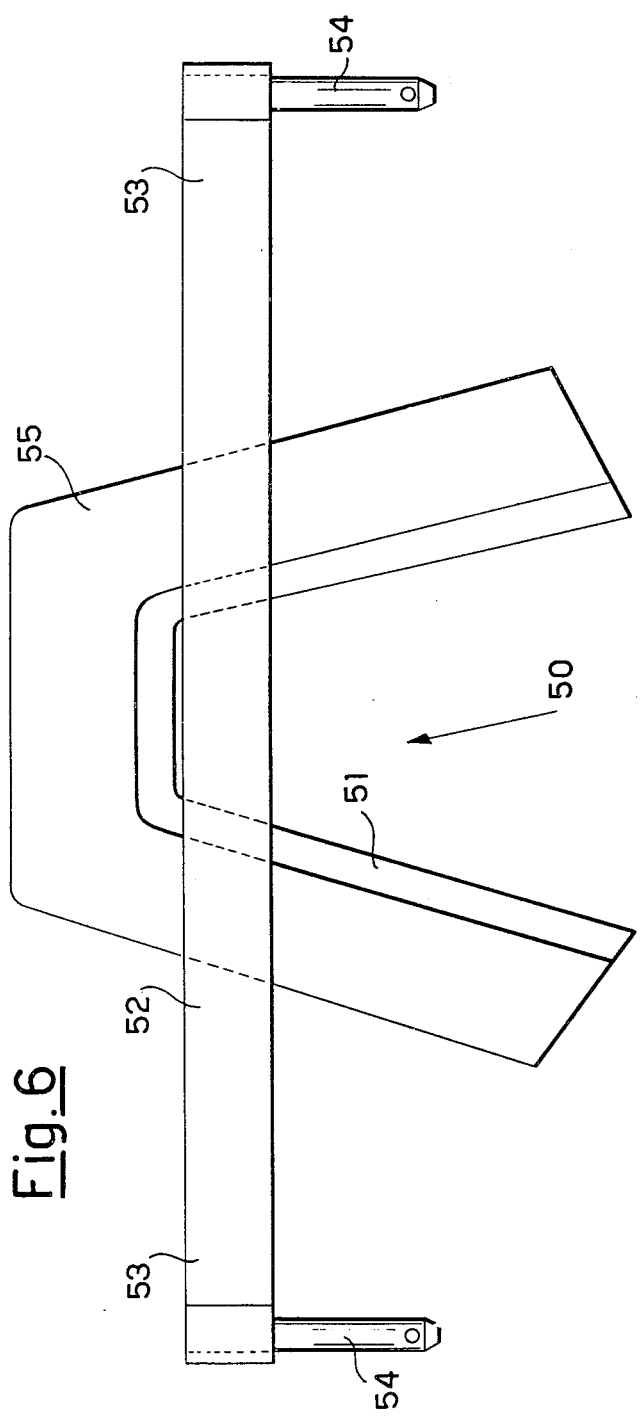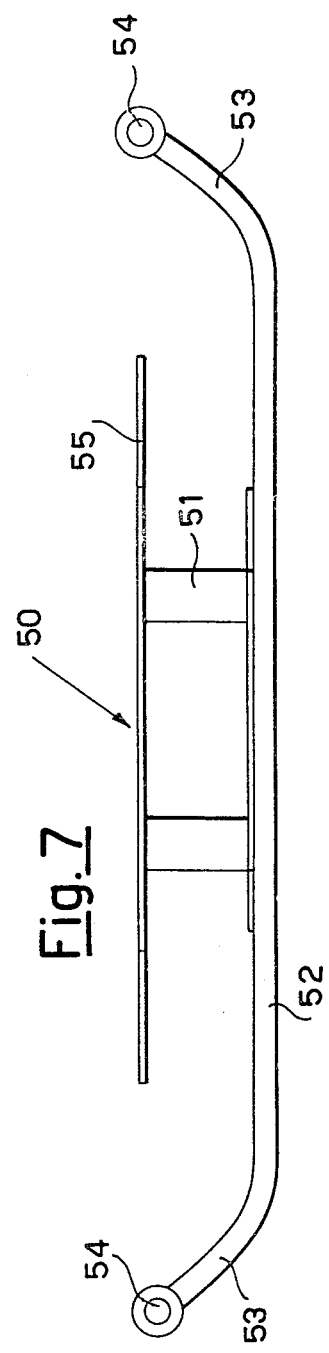

LIFT FOR MOPEDS AND MOTORCYCLES

DESCRIPTION

The invention relates to a lift for mopeds and motorcycles, in particular of the type commonly known as a Vespa, and light mopeds.

It is always difficult to carry out repair and maintenance work on mopeds which have to be inverted or rested on one side on the ground.

In this position, which is certainly uncomfortable for the operator, he is at the present time required to carry out every type of operation on the engine, on the transmission members and on the electrical system. In this situation, work carried out on the difficulty accessible parts of the moped takes longer and is fatiguing, and sometimes the operator is compelled to carry out work which is incomplete and lacks care.

For these reasons, the present invention provides a lift by means of which the moped on which the work is to be carried out is lifted from the ground by a sufficient distance for the operator to gain easy access to each of its components, even to the most hidden and inaccessible component, so that he is able to carry out any sort of work on any member to be repaired or replaced more rapidly and with greater accuracy. To this end, besides lifting any moped or motorcycle, the invention is also provided with means which enable certain of them to be partly tilted, so as to further facilitate examination of any unit to be repaired. These and further objects which will be more apparent hereinafter are attained according to the present invention by a lift for raising mopeds, characterised by comprising a base to which there is hinged a cylinder, the rod of which is hinged in its turn to a frame which swings relative to the base about a horizontal axis; one end of the frame being provided with a support designed to hold a motorcycle in a releasable manner; the support being hinged to the end of the frame so that it can rise parallel to itself during swinging of the frame; there being provided hydraulic and/or pneumatic means for controlling said cylinder, and safety means for rigidly securing the frame when rotated in order to lift the motorcycle.

The lift according to the invention is described by way of non-limiting example hereinafter with reference to the accompanying drawings in which:

FIGS. 4, 5, 6 and 7 are views of certain constituent elements of the device of the preceding figures;

Figure 1:
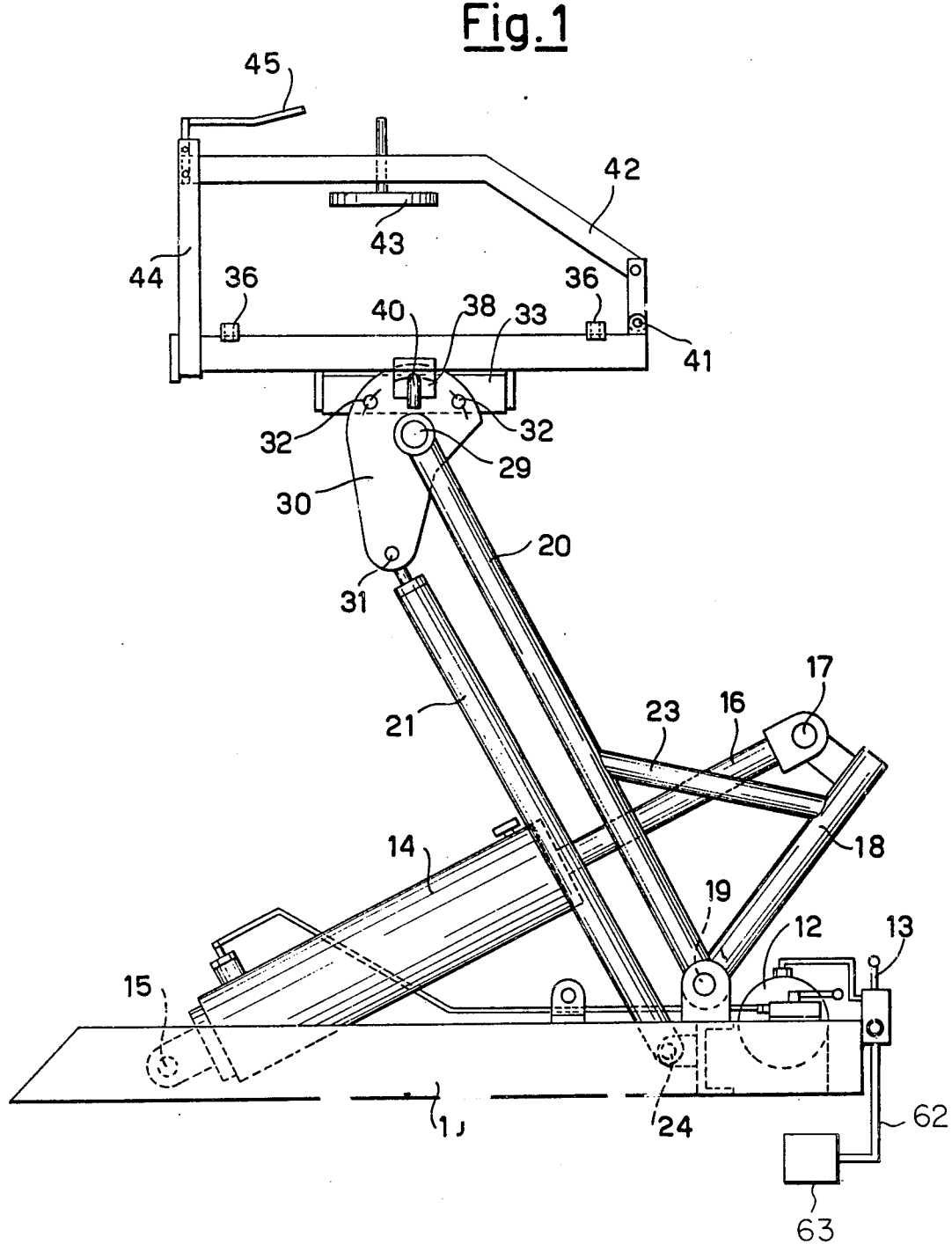
FIGS. 1, 2 and 3 are a front elevational, side elevational and plan view respectively of the device according to the invention.
Figure 8:
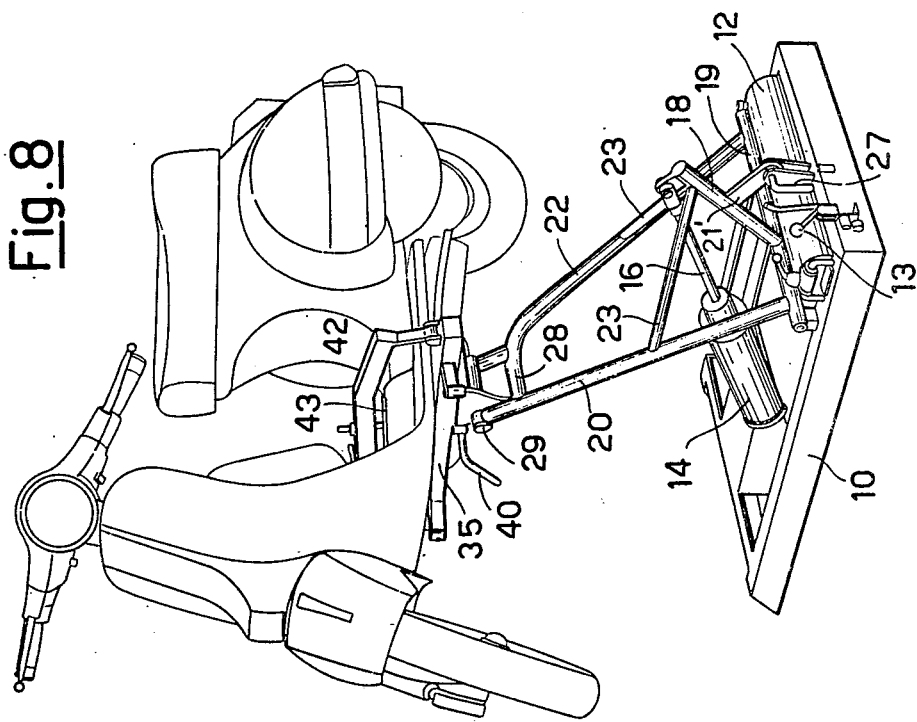
FIGS. 8 and 9 show two applications of the device according to the invention.
Figure 2:
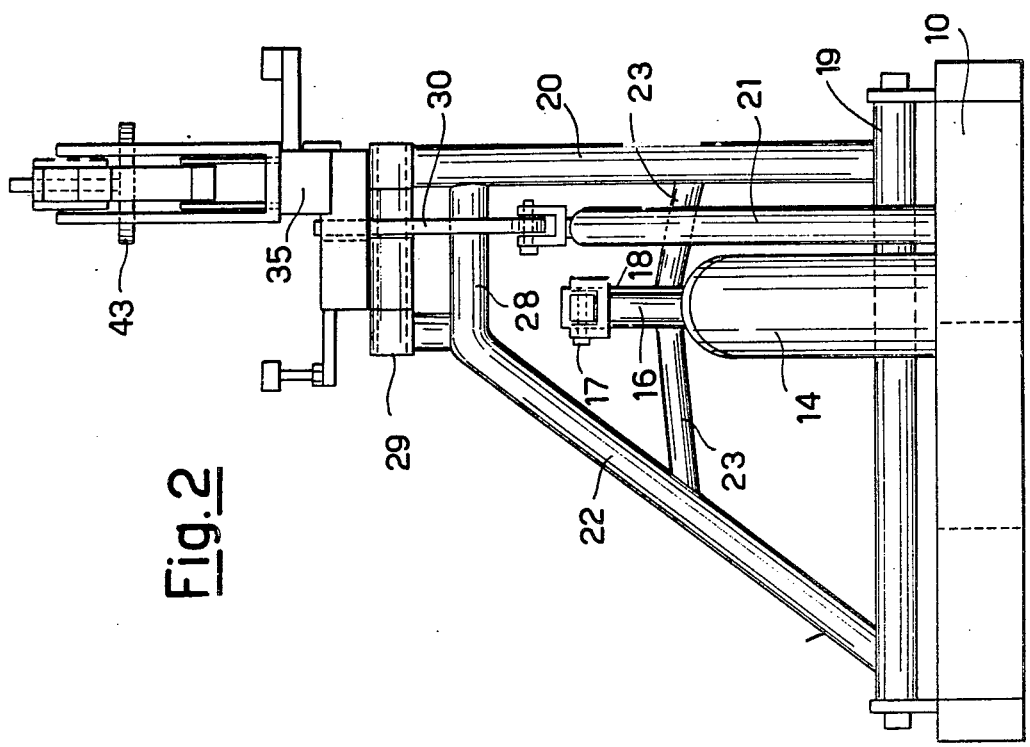
Figure 3:
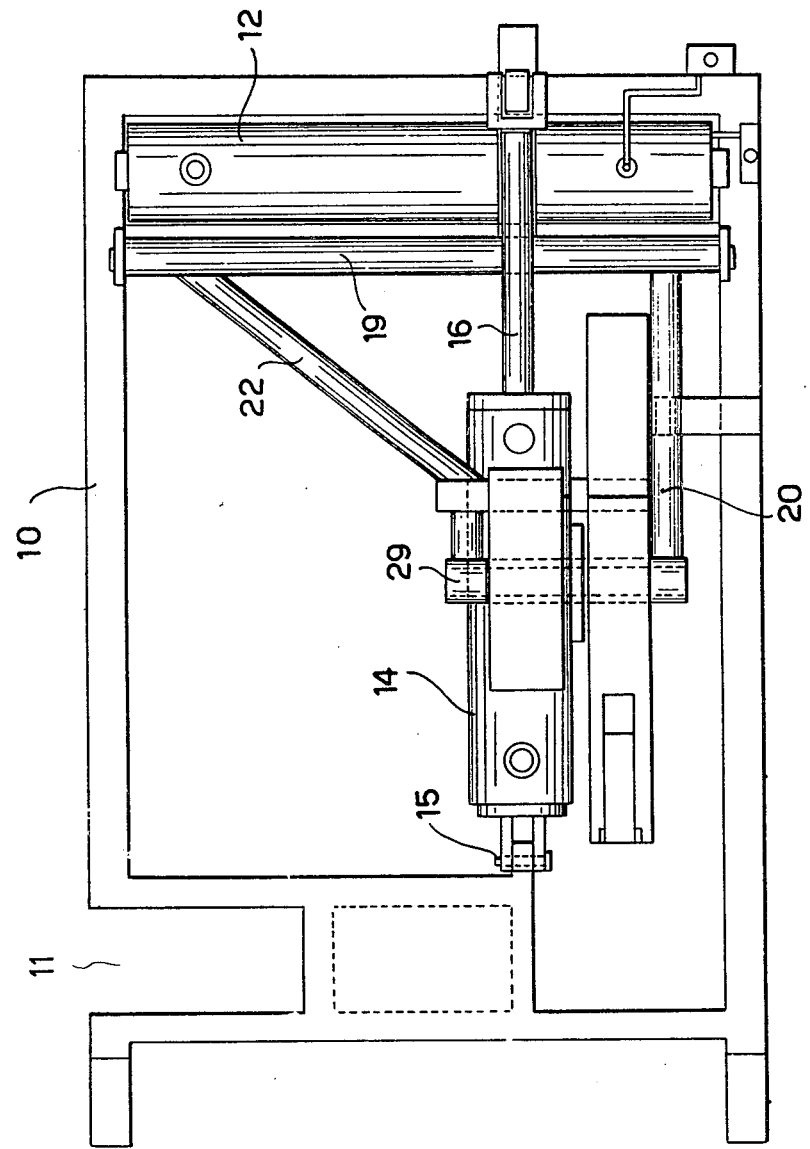

A frame 10 resting on the ground forms the base of the lift framework.

In the frame 10 there is provided a recess 11 for receiving the rear wheel of the motorcycle as described hereinafter. The frame 10 contains an oil tank 12 which, by means of suitable pipes, is connected to a hydraulic cylinder 14.

Manual lever controls 13 control the supply of fluid under pressure through a conduit 62 from a source 63, thereby to operate the hydraulic cylinder 14, which is hinged at 15 to the frame 10, and has its rod 16 hinged at 17 to an arm 18.

Said arm 18 is rigidly connected to a frame constituted by a horizontal cross member 19, two further arms 20 and 22 respectively, and two connection pieces 23.

An appendix 24 rigid with the arm 18 is provided with an end bore 25, and is designed for insertion (at the end of the lifting operation) into a bored fork 26, through which a safety pin 27 is inserted as described hereinafter.

Figure 10:
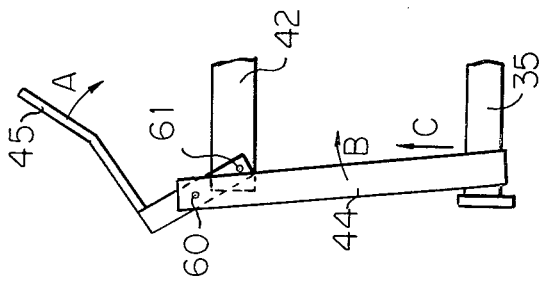
FIG. 10 is a fragment of FIG. 1, showing the toggle clamp in released position.

The two arms 20 and 22 are connected together upperly by connection pieces 28 and 29, this latter having hinged thereto a plate 30 which is hinged at a further end 31 to a further arm 21. This latter is pivoted at 21' to the base 10. The plate 30 is provided with three bores 32 disposed along a circular arc having as its centre the axis on which it is pivoted to the connection piece 29. A bracket 33 is welded to the connection piece 29. The bracket 33 is provided with oblique arms 34 and a cross member 35. Two further arms 36 are welded to this latter in a projecting manner. Rubber blocks 37 can be inserted into bores 47 in the arms 34, and are thus adjustable in distance from the cross member 35, the end of the arms 36 being bored at 46. A projecting piece 38 is welded to the cross member 35, and comprises a bore 39 into which is inserted a pin 40, which also passes through one of the bores 32 of the plate 30. A further arm 42, provided with a disc 43 which is adjustable in distance from said arm, is hinged to the cross member 35. At its other end, the arm 42 has hinged to it a fork 44, which is designed to be mounted over the other end of the cross member 35 and to be locked in position by rotating a lever 45 by rotation of the parts about pivots 60 and 61 as seen in FIG. 10, in the manner of a conventional toggle clamp.

It will thus be seen that there is provided by the present invention a lift for raising mopeds and motorcycles, and comprising a base 10, a cylinder 14 hinged on the base for vertical swinging movement about a horizontal axis, a first rod 19 which is horizontal and which is supported on the base for rotation about its axis, a second rod 18 fixed to the first rod intermediate the length of the first rod and extending upwardly from the first rod, the cylinder having a piston therein having a piston rod 16 that is pivotally connected to the second rod 18 remote from the first rod thereby to rotate the first rod about the horizontal axis of the first rod 19, third and fourth arms 20 and 22 rigidly secured to each other and to the first rod at points disposed on opposite sides of point of securement of the second rod to the first rod, said third and fourth arms being disposed at a substantial angle to the second rod, said first and second rods 19 and 18 lying in a common plane, a fifth rod 21 pivotally connected at one end to the base, a plate 30 to which the fifth rod is pivotally connected at its end remote from the base, said third and fourth rods being pivotally connected to the plate at a point 29 remote from the first rod, said fifth rod 21 being parallel to and spaced from the plane of said third and fourth rods, and a support 33-45 for mopeds and motorcycles carried by said plate 30.

The operation of the described lift is as follows. Initially, when in the rest position, each member is on the ground, i.e. substantially contained in the plane of the base 10 so that the bracket 33 and its cross member 35 are at a height such as to be able to receive the footboard of the moped thereon. In this specific case, reference will be made to the moped commonly known as a Vespa, i.e. with a footboard lying between the two wheels and suitable for the support described.

The moped is moved forward so that its rear wheel becomes inserted into the compartment 11 in the base 10, and its footboard rests on the bracket 33 by way of the blocks 37. The arm 42 is then swung, locking the fork 44 onto the cross member 35 by rotating the eccentric lever 45. The disc 43 can be made to traverse by unscrewing it, until it rests against the upper surface of the footboard of the motorcycle, which thus becomes firmly locked within this frame, which acts as a clamp. The lifting operation on the moped can then begin, and takes place in the following manner. On feeding oil to the cylinder 14 by operating the lever 13, the rod 16 extends to swing the arm 18, and with it the arms 20 and 22 which are rigid therewith. The frame which supports the moped then rises while always remaining parallel to itself, in that the plate 30, which is pivoted to the connection piece 29 of the arms 20 and 22, is kept in its vertical position by the third arm 21, which rises simultaneously with the first two and therefore prevents the frame from rotating during the lifting operation. At the end of this operation, when the Vespa has been raised through the entire prescribed height, the lift can be locked by inserting the pin 27 into the bores of the fork 26 and appendix 24, which are now aligned. If the moped now has to be rotated to give easier access to certain parts, the pin 40 has only to be withdrawn from the bores of the bracket 38 and plate 30, the overlying frame rotated until the bore 39 of the bracket 38 mates with a new right or left bore 32 of the plate, and the pin 40 reinserted to again lock the frame. The moped is thus now inclined laterally through a certain angle sufficient for the required purpose. After the maintenance work has been finished and the motorcycle returned to the horizontal position, the rod 16 is withdrawn in order to bring the frame to the ground in its rest position, in which the moped footboard is released by uncoupling the fork 44 from the cross member 35, and the Vespa can then be removed from the lift.

Figure 9:
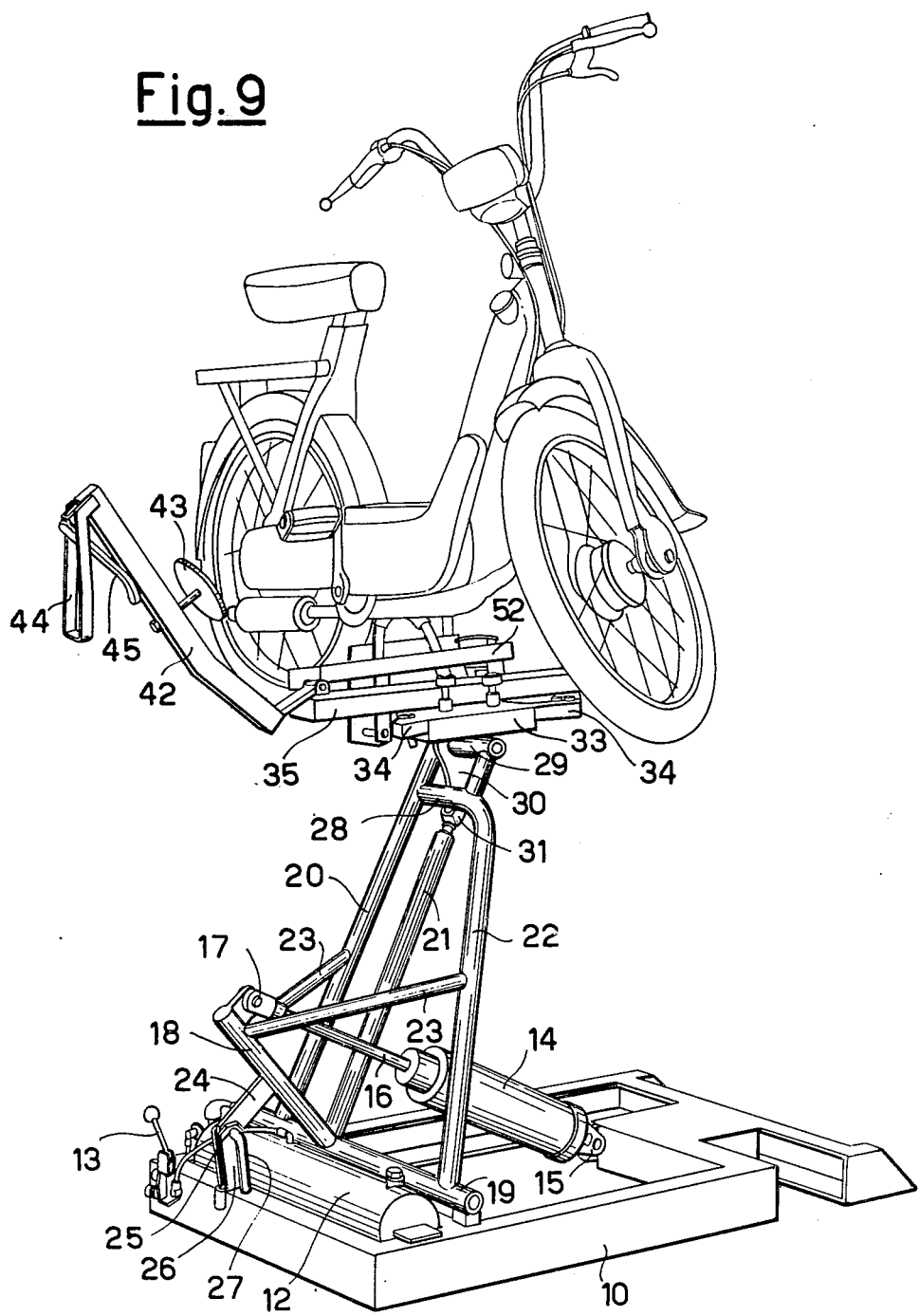

FIGS. 6, 7 and 9 show a further application of the device according to the invention, which instead of being used to raise Vespas is used to raise light mopeds of other type. Light mopeds are normally not provided with a footboard of the Vespa type, with the result that the coupling frame 42 is no longer usable, and would need to be modified according to the type of moped, thus nullifying the universal applicability of the lift which the invention is required to provide. In order to make the lift universally applicable, a support 50 illustrated in FIGS. 6 and 7 is proposed, constituted by a U section 51 provided with a cross member 52. Said cross member is slightly arcuate at its ends 53, where it is provided with two pegs 54. During assembly, it is necessary only to insert the pegs 54 into the bores 46 of the cross member 35 (FIG. 5) in order to securely fix the element 50. As can be deduced from FIG. 9, to raise the moped its front wheel is inserted into the compartment 11 of the base 10 (in contrast to the Vespa, of which the rear wheel was inserted). The moped stand is then mounted over the U section 51, and remains retained securely within it between its lateral wall 55 and the front cross member 52. The frame 42 which previously acted as a clamp is no longer used, as the motorcycle is fixed securely to the lift.

The actual configuration of the motorcycle means that it is no longer necessary to incline it laterally in order to carry out maintainance work on it, as in the case of the Vespa, and thus the cross member 35 is not reclined angularly, and the motorcycle always remains in its vertical position with its wheels parallel to the ground.

In the two applications of the lift according to the invention illustrated herein, it has been assumed that the lifting member, i.e. the cylinder 14, is of hydraulic operation, but the same object would be attained if this were of the pneumatic or mixed control type, as there would be no detraction from the advantages of the proposed lift.

What we claim is:

1. A lift for raising mopeds and motorcycles, comprising a base, a cylinder hinged on the base for vertical swinging movement about a horizontal axis, a first rod which is horizontal and which is supported on the base for rotation about its axis, a second rod secured to the first rod at a point intermediate the length of the first rod and extending upwardly from the first rod, the cylinder having a piston therein having a piston rod that is pivotally connected to the second rod remote from the first rod thereby to rotate the first rod about the horizontal axis of the first rod, third and fourth arms rigidly secured to each other and to the first rod at points disposed on opposite sides of the point of securement of the second rod to the first rod, said third and fourth arms being disposed at a substantial angle to the second rod, said first and second rods lying in a common plane, a fifth rod pivotally connected at one end to the base, a plate to which the fifth rod is pivotally connected at its end remote from the base, said third and fourth rods being pivotally connected to the plate at a point remote from the first rod, said fifth rod being parallel to and spaced from the plane of said third and fourth rods, and a support for mopeds and motorcycles carried by said plate.

2. A lift as claimed in claim 1, and means mounting said support for selective adjustment relative to the plate thereby selectively to alter the inclination of the support.

3. A lift as claimed in claim 1, and means for releasably securing mopeds and motorcycles to said support.

* * * * *